United States Patent
Pan et al.

(10) Patent No.: US 11,783,450 B2
(45) Date of Patent: Oct. 10, 2023

(54) METHOD AND DEVICE FOR IMAGE PROCESSING, TERMINAL DEVICE AND STORAGE MEDIUM

(71) Applicant: BEIJING XIAOMI MOBILE SOFTWARE CO., LTD., Beijing (CN)

(72) Inventors: Chiaho Pan, Beijing (CN); Lin Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 295 days.

(21) Appl. No.: 17/212,993

(22) Filed: Mar. 25, 2021

(65) Prior Publication Data

US 2022/0036511 A1 Feb. 3, 2022

(30) Foreign Application Priority Data

Jul. 31, 2020 (CN) .......................... 202010761645.2

(51) Int. Cl.
*G06T 5/00* (2006.01)
*G06T 7/90* (2017.01)

(52) U.S. Cl.
CPC ............... *G06T 5/001* (2013.01); *G06T 7/90* (2017.01); *G06T 2207/10024* (2013.01); *G06T 2207/20081* (2013.01); *G06T 2207/20084* (2013.01)

(58) Field of Classification Search
CPC ............... G06T 5/00–005; G06T 7/90; G06T 2207/10024; G06T 2207/20081; G06T 2207/20084; H04N 25/61–69
See application file for complete search history.

(56) References Cited

U.S. PATENT DOCUMENTS

| | | | |
|---|---|---|---|
| 10,382,712 B1* | 8/2019 | Forutanpour | H04N 23/80 |
| 2005/0093992 A1* | 5/2005 | Fukumoto | G06T 5/003 348/222.1 |
| 2009/0027521 A1 | 1/2009 | Fukumoto | |
| 2011/0242352 A1* | 10/2011 | Hikosaka | H04N 25/61 348/222.1 |
| 2013/0002902 A1* | 1/2013 | Ito | H04N 25/61 348/224.1 |
| 2013/0120614 A1* | 5/2013 | Oyama | G06T 5/10 348/234 |

(Continued)

FOREIGN PATENT DOCUMENTS

| | | |
|---|---|---|
| CN | 110489580 A | 11/2019 |
| JP | 2005136917 A | 5/2005 |

(Continued)

OTHER PUBLICATIONS

Wallace, "Truly comprehensive screen mobile phone imagination ranking: OPPO new machine only the second, the first refresh three views", mailed on Apr. 14, 2019, https://www.leikeji.com/article/25608, (9p).

(Continued)

*Primary Examiner* — Sean T Motsinger
(74) *Attorney, Agent, or Firm* — Arch & Lake LLP (57) ABSTRACT

Provided are a method and device for image processing, a terminal device and a storage medium. The method includes: a high-brightness region is determined based on brightness of pixels in a first image, the brightness of the pixels in the high-brightness region being higher than the brightness of the pixels around the high-brightness region; a diffraction region in the first image is determined based on the high-brightness region, the diffraction region being an image region around the high-brightness region; and brightness of the diffraction region is reduced to obtain a second image. Through the method, after the brightness of the diffraction region is reduced, an overlap image formed by diffraction is alleviated, and the image is more real.

19 Claims, 6 Drawing Sheets

(56) References Cited

U.S. PATENT DOCUMENTS

| | | | | |
|---|---|---|---|---|
| 2017/0026592 A1* | 1/2017 | Kuang | .................. | H04N 25/61 |
| 2018/0255254 A1* | 9/2018 | Kuang | .................. | H04N 25/61 |
| 2019/0213719 A1* | 7/2019 | Hiasa | ..................... | G06N 3/084 |
| 2021/0150742 A1* | 5/2021 | Sato | ....................... | H04N 23/81 |
| 2021/0350590 A1* | 11/2021 | Kim | ......................... | G01J 3/28 |
| 2022/0003541 A1* | 1/2022 | Ma | ..................... | G01B 11/2518 |
| 2022/0036511 A1* | 2/2022 | Pan | ......................... | G06T 5/004 |
| 2022/0375045 A1* | 11/2022 | Wu | ........................... | G06T 3/40 |
| 2023/0030068 A1* | 2/2023 | Nakata | .................. | H04N 23/55 |

FOREIGN PATENT DOCUMENTS

| | | |
|---|---|---|
| JP | 2008227976 A | 9/2008 |
| JP | 2011022656 A | 2/2011 |
| JP | 2011259089 A | 12/2011 |
| JP | 2016051982 A | 4/2016 |
| KR | 20090061926 A | 6/2009 |

OTHER PUBLICATIONS

First Office Action of the Korean Application No. 10-2021-0035024, dated Mar. 15, 2022, (16p).
Yuqian Zhou et al, "Image Restoration for Under-Display Camera", Arxiv. Org, Cornell University Library, 201 Olin Library Cornell University Ithaca, NY 14853, Mar. 10, 2020 (Mar. 10, 2020), XP081618592, (17p).
Supplementary European Search Report in the European Application No. 21165513.9, dated Sep. 24, 2021, (8p).
First Office Action of the Japanese Application No. 2021-046853, dated May 12, 2022 with English translation, (6p).

\* cited by examiner

METHOD AND DEVICE FOR IMAGE PROCESSING, TERMINAL DEVICE AND STORAGE MEDIUM

CROSS-REFERENCE TO RELATED APPLICATION

This application is based upon and claims priority to Chinese patent application No. 202010761645.2, filed on Jul. 31, 2020, the entire contents of which are incorporated herein by reference in their entirety for all purposes.

TECHNICAL FIELD

The present disclosure generally relates to the technical field of electronic devices, and more particularly, to a method and device for image processing, a terminal device and a storage medium.

BACKGROUND

With the development of terminal technologies, more and more conveniences have been brought to people's daily life. Requirements of users on attractive appearances and the like of terminal devices have also been gradually increased. Full screen has become the trend of development of mobile terminals.

Many full screens are implemented in a lifting manner. For example, the lifting manner includes modules lifting, cover slipping, lateral rotation and other like lifting mechanisms, as well as other designs such as a waterdrop screen and a holed screen.

In these full screen designs, a camera module for photographing is underneath a display screen. A metallic circuit is distributed on the display screen, light transmittance may be reduced in the region of the metallic circuit, and scattering and diffraction may exist in part of a light transmitting region of the metallic circuit. Consequently, when the camera module underneath the display screen is adopted for photographing, image quality loss may be caused.

SUMMARY

The present disclosure provides a method and device for image processing, a terminal device and a storage medium.

According to a first aspect of examples of the present disclosure, a method for image processing is provided, which may include:
  determining a high-brightness region based on brightness of pixels in a first image, wherein brightness of pixels in the high-brightness region is higher than brightness of pixels around the high-brightness region;
  determining a diffraction region in the first image based on the high-brightness region, wherein the diffraction region is an image region around the high-brightness region; and
  reducing brightness of the diffraction region to obtain a second image.

According to a second aspect of the examples of the present disclosure, a device for image processing is provided, which may include:
  a first determination module, configured to determine a high-brightness region based on brightness of pixels in a first image, brightness of pixels in the high-brightness region being higher than brightness of pixels around the high-brightness region;
  a second determination module, configured to determine a diffraction region in the first image based on the high-brightness region, the diffraction region being an image region around the high-brightness region; and
  a regulation module, configured to reduce brightness of the diffraction region to obtain a second image.

According to a second aspect of the examples of the present disclosure, a terminal device is provided, which may include a processor and a memory storing instructions executable by the processor to implement the method for image processing as described in the first aspect.

According to a third aspect of the examples of the present disclosure, a storage medium is provided, which stores instructions that, when executed by a processor of a computer, cause the computer to execute the method for image processing as described in the first aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
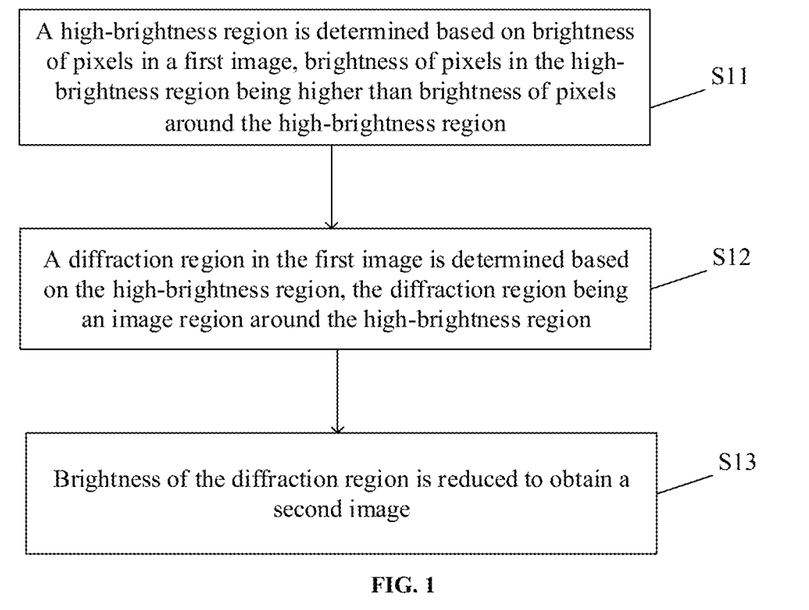
FIG. 1 is a flowchart of a method for image processing according to an example of the present disclosure.

FIG. 1 is a flowchart of a method for image processing according to an example of the present disclosure. As shown in FIG. 1, the image processing method includes the following operations.

In S11, a high-brightness region is determined based on brightness of pixels in a first image, brightness of pixels in the high-brightness region being higher than brightness of pixels around the high-brightness region.

In S12, a diffraction region in the first image is determined based on the high-brightness region, the diffraction region being an image region around the high-brightness region.

In S13, brightness of the diffraction region is reduced to obtain a second image.

The image processing method of the present disclosure may be implemented by a mobile terminal or a server. When implemented by a server, a mobile terminal may send a collected first image to the server, and the server, after processing the first image through the operations S11 to S13 to obtain a second image, may send the second image to the mobile terminal for displaying.

For example, the image processing method is applied to a mobile terminal. The mobile terminal may be a mobile phone, a tablet computer, a camera or an intelligent wearable device, etc. The mobile terminal also may be an image collection module, for example, a front camera or rear camera in a mobile phone, and may collect images.

Figure 2A:
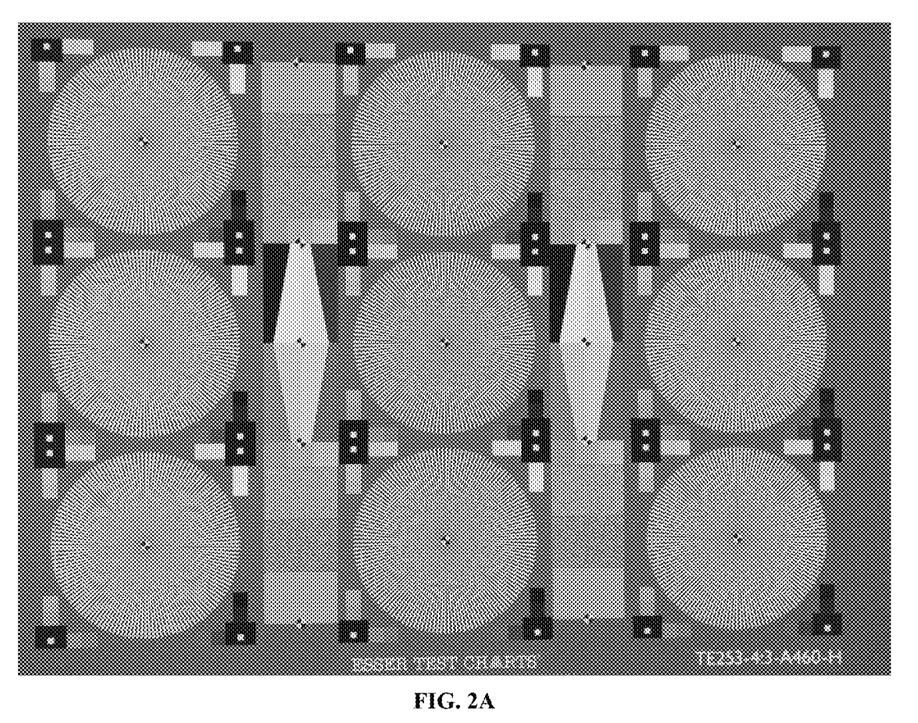
FIG. 2A is a first exemplary diagram of an image according to an example of the present disclosure.
Figure 2B:
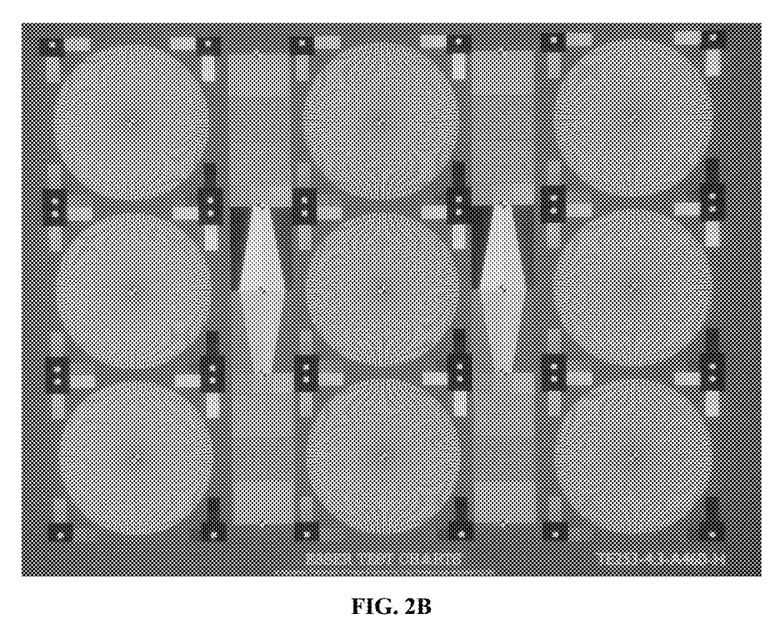
FIG. 2B is a second exemplary diagram of an image according to an example of the present disclosure.

FIG. 2A is a first exemplary diagram of an image according to an example of the present disclosure. FIG. 2B is a second exemplary diagram of an image according to an example of the present disclosure. The image shown in FIG. 2A is an image obtained without influence of an occlusion such as a display screen or glass. FIG. 2B shows an image obtained under influence of an occlusion such as a display screen or glass. Comparison between FIG. 2A and FIG. 2B shows that sharpness and contrast of the image shown in FIG. 2A are higher than those of the image in FIG. 2B.

The phenomenon that the image quality is damaged is most obvious particularly when an object with higher brightness such as an illumination light source or sunlight is shot.

Figure 3:
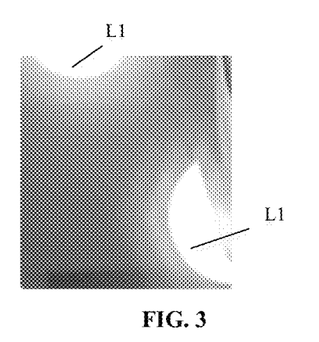
FIG. 3 is a third exemplary diagram of a diffraction image according to an example of the present disclosure.
Figure 4:
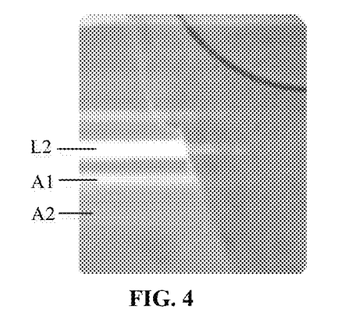
FIG. 4 is a fourth exemplary diagram of a diffraction image according to an example of the present disclosure.

FIG. 3 is a third exemplary diagram of a diffraction image according to an example of the present disclosure. FIG. 4 is a fourth exemplary diagram of a diffraction image according to an example of the present disclosure. As shown in FIG. 3 and FIG. 4, due to the influence of a display screen, when an illumination light source is imaged, an overlap image formed by diffraction may exist in the vicinity of the light source, and consequently, an obtained image is not real.

Therefore, in the present disclosure, a region with higher brightness (a high-brightness region) in an image is detected, and an overlap region, formed by diffraction, in the image in the vicinity of the high-brightness region is found for compensation to remove the overlap image formed by diffraction, thereby obtaining a more real image.

In the example of the present disclosure, the high-brightness region is determined based on the brightness of the pixels in the first image, and brightness of pixels in the high-brightness region is higher than brightness of pixels around the high-brightness region. The brightness of the pixels in the high-brightness region being higher than the brightness of the pixels around the high-brightness region may refer to that a difference value between the brightness of the high-brightness region and the brightness of the pixels around the high-brightness region is greater than a predetermined difference value, or may refer to that an average brightness value of the high-brightness region is greater than an average value of the pixels around the high-brightness region.

In an example, in the operation S11, the high-brightness region may be a continuous region with maximum brightness in the image, and the brightness of the pixels in the high-brightness region is higher than the brightness of the pixels around the high-brightness region.

In another example, in the operation S11, the high-brightness region may be one or more regions with higher brightness among multiple regions where the brightness of the image pixels in the image changes suddenly. For example, when multiple discretely distributed lamps are in a collected space during image collection, multiple high-brightness regions corresponding to the lamps may be formed in the image.

In an implementation, when a high-brightness object such as a light source is photographed, a value of each pixel after imaging of the high-brightness object usually tends to a saturation value corresponding to a collection bit width. Therefore, a threshold approaching the saturation value may be preset to determine the high-brightness region. For example, when the collection bit width of an image is 8 bits, a value range of pixels is 0 to 255, 255 being the saturation value. In such a case, the threshold may be set to be 230, and a pixel exceeding the threshold 230 may be determined as a pixel in the high-brightness region.

In another mode, the operation that the high-brightness region is determined based on the brightness of the pixels in the first image may includes that:

clustering is performed based on a brightness value of each pixel in the first image to obtain different regions, a brightness difference between pixels in any region being within a preset difference range; and a region with a maximum average brightness value is determined from the obtained different regions as the high-brightness region.

In the example, a device for image processing may cluster the brightness value of each pixel in the first image to divide the pixels with similar brightness (namely the brightness differences in a preset difference range) into a same class, thereby obtaining different regions. For the obtained regions with different brightness, statistics may be made to the average brightness values of the regions, and a region with a maximum average brightness value is determined as the high-brightness region.

It can be understood that, since the brightness differences of the regions are in the preset range, when the region with the maximum average brightness value is determined as the high-brightness region, the brightness of the pixels in the high-brightness region is higher than the brightness of the pixels around the high-brightness region. Compared with a threshold-based manner for determining the high-brightness region, the clustering manner is more universal.

In the operation S12, the image processing device may determine the diffraction region around the high-brightness region in the first image based on the high-brightness region. Diffraction is a physical phenomenon that light meets an obstacle in a propagation process and is deviated from an original straight line for propagation to form a light intensity distribution. The diffraction region formed by diffraction includes subregions that are alternately dark and bright (namely the brightness is non-uniform) and may include a subregion similar to the high-brightness region in shape.

For example, in FIG. 3, regions identified with L1 are the high-brightness region. The high-brightness region is annular. A diffraction region with non-uniform brightness exists in the vicinity of the high-brightness region, and the diffraction region includes a subregion shaped to be similarly annular.

For example, in FIG. 4, L2 identifies a high-brightness region, diffraction regions with non-uniform brightness also exist on two sides of the high-brightness region, and the diffraction regions include subregions shaped to be similarly rectangular.

It is to be noted that, since the diffraction phenomenon is more obvious when an object with higher brightness such as an illumination light source or sun light is shot, the brightness of the diffraction region may be higher than brightness of a background region in the first image obtained by photographing, the background region referring to a region in the first image other than the diffraction region and the high-brightness region. Therefore, in the present disclosure, the brightness of the diffraction region is reduced to obtain the second image in the operation S13. It can be understood that reduction of the brightness of the diffraction region means alleviation of the influence of an overlap image formed by diffraction, so that a more real image may be obtained.

When the brightness of the diffraction region is reduced, a regulated value of the brightness of the diffraction region may be determined based on the brightness of the background region to make the brightness of the diffraction region tend to be consistent with the brightness of background, or the brightness of the diffraction region may also be reduced in form of a fitting function. No limits are made thereto in the example of the present disclosure.

Figure 5A:
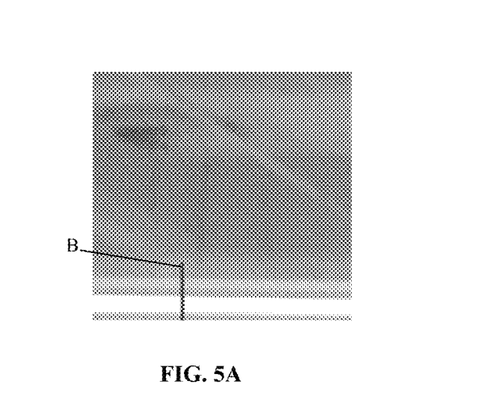
FIG. 5A is a fifth exemplary diagram of a diffraction image according to an example of the present disclosure.
Figure 5B:
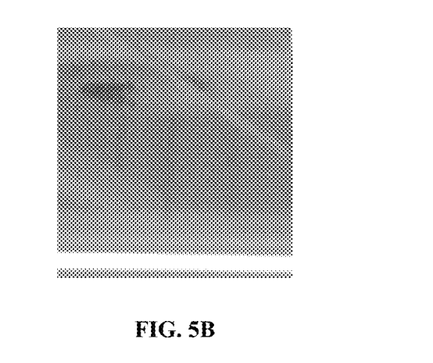
FIG. 5B is a schematic diagram illustrating reduction of brightness of a diffraction region according to an example of the present disclosure.

FIG. 5A is an exemplary diagram of a diffraction image according to an example of the present disclosure. FIG. 5B is a schematic diagram illustrating reduction of brightness of a diffraction image according to an example of the present disclosure. As shown in FIG. 5A, the longitudinal region indicated by B is part of the high-brightness region and the diffraction region. It can be seen from the figure that the brightness of the diffraction region around the high-brightness region is higher than that of the background region. As shown in FIG. 5B, after the brightness of the diffraction region is reduced, an overlap image formed by diffraction is alleviated, and the image is more real.

In an implementation, for alleviating the phenomenon that an image is not real due to diffraction, an image obtained under normal exposure and one or more groups of images obtained under reduced exposure may be fused in a High-Dynamic Range (HDR) manner to alleviate an overlap image formed by diffraction.

Figure 6:
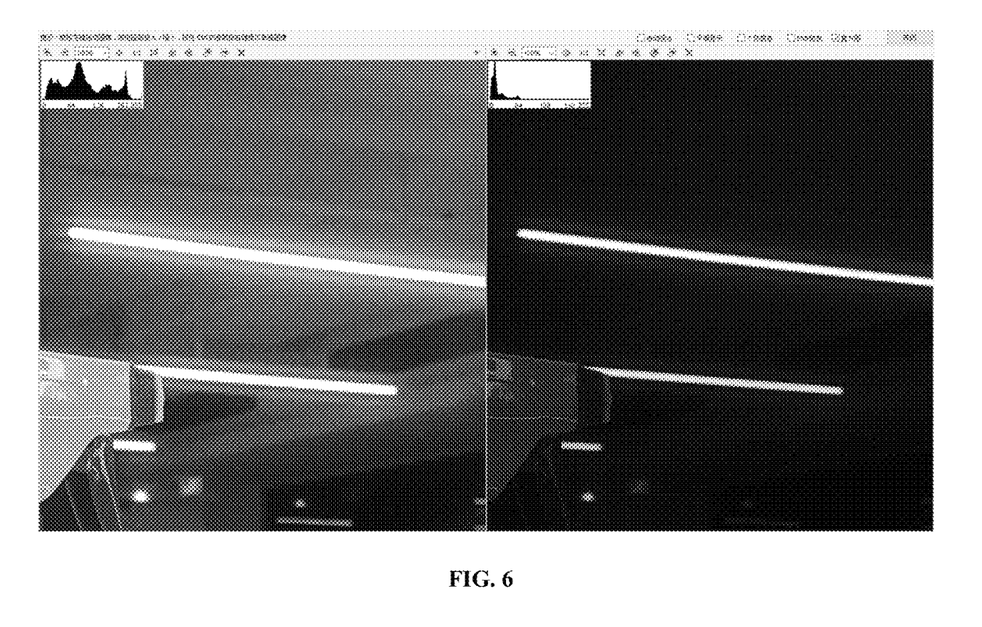
FIG. 6 is an exemplary diagram of an exposed image according to an example of the present disclosure.

FIG. 6 is an exemplary diagram of an exposed image according to an example of the present disclosure. The image on the left side in FIG. 6 is an image obtained under normal exposure, and the image on the right side is an image obtained when the exposure value is lower than that of normal exposure. As shown in FIG. 6, there is an overlap image formed by diffraction in a normally exposed image, while an overlap image formed by diffraction in an image corresponding to a low exposure value on the right side is not so obvious, so that the two images may be fused to alleviate the overlap-image phenomenon caused by diffraction, and the image obtained by fusion is more real.

However, in the HDR manner, since an exposure value is unlikely to be controlled, when the exposure value is regulated to be excessively low, there is certain influence on fusion of the original high-brightness region, and when the exposure value is regulated inadequately, there may still be an overlap image formed by diffraction in an image obtained under low exposure. Therefore, there is a problem that the overlap image formed by diffraction may not be eliminated during fusion.

It can be understood that, compared with the abovementioned manner, the manner of determining a high-brightness region in a first image and then determining a diffraction region based on the high-brightness region and reducing brightness of the diffraction region to obtain a second image with regulated brightness in the present disclosure has the following advantages. On one hand, it is unnecessary to regulate an exposure value to shoot multiple frames of images, so that the power consumption in frequent photographing of a mobile terminal may be reduced. On the other hand, brightness is reduced based on a single frame of image to alleviate an overlap image formed by diffraction, and the influence of images obtained under other different exposure values is eliminated, so that the effect of alleviating the overlap image formed by diffraction is better.

In an example, the operation S12 may include that:
a light field distribution of the brightness of the pixels in the first image is determined;
it is determined whether an image region meeting a diffraction phenomenon exists in a brightness reduction direction of the high-brightness region in the first image or not based on the light field distribution; and
when the image region meeting the diffraction phenomenon exists, the image region is determined as the diffraction region.

Figure 7:
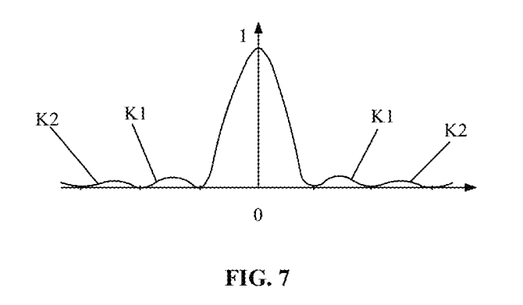
FIG. 7 is a diagram of a light intensity distribution curve corresponding to a diffraction phenomenon.

As described above, diffraction is a phenomenon that light meets an obstacle in a propagation process and is deviated from an original propagation path to form a light intensity distribution. FIG. 7 is a diagram of a light intensity distribution curve corresponding to a diffraction phenomenon. As shown in FIG. 7, the abscissa axis denotes an outward extension range of a light source, and the ordinate axis denotes a ratio of a light intensity within the corresponding extension range to a light intensity at the light source.

It can be seen from FIG. 7 that the light intensity at the light source is maximum and the light intensity in a local range centered at the light source and far away from the light source has a normal distribution. At a boundary of the normal distribution, in a direction far away from the light source, the light intensity gradually increases, and then the light intensity decreases after increasing to a maximum value. In this way, a new phenomenon similar to normal distribution is formed, i.e., K1 shown in FIG. 7. It can be seen from FIG. 7 that the normal distribution repeatedly appears, only that a peak value of the normal distribution is lower at a position farther away from the light source. There is also a normal distribution K2 in the light intensity distribution curve. Of course, another normal distribution phenomenon that peak values gradually decrease may also exist, which is not shown in FIG. 7. A change trend of the light intensity distribution is a phenomenon that there are subregions that are alternately dark and bright in the diffraction region.

The light intensity distribution curve shown in FIG. 7 is a curve corresponding to a Point Spread Function (PSF). The brightness of an image reflects the light intensity, so that the brightness of each pixel in the first image may be fitted with a PSF model to determine the light field distribution of the brightness of the pixels in the first image. It can be understood that, when diffraction exists, the light field distribution of the brightness of each pixel in the first image is similar to the light intensity distribution curve in FIG. 7.

In the example, it is determined whether the image region meeting the diffraction phenomenon exists in the brightness reduction direction of the high-brightness region in the first image or not based on the light field distribution of each pixel in the first image. It is to be noted that, for the diffraction phenomenon, the light intensity distribution during diffraction is fitted based on a diffraction experiment to obtain images meeting repeated normal distribution (such as K1 and K2 parts) phenomenons in the light intensity distribution curve in FIG. 7 to determine an image mode. In the image mode, there are regions that are alternately dark and bright, namely there are subregions that are alternately dark and bright in the diffraction region.

Therefore, in the example of the present disclosure, when there is the diffraction phenomenon, there may be patterns that are alternately dark and bright in the first image. In such a case, an image region including the patterns that are alternately dark and bright is determined as the diffraction region.

In an example, the operation that it is determined whether the image region meeting the diffraction phenomenon exists in the brightness reduction direction of the high-brightness region in the first image or not based on the light field distribution may include that:

it is determined whether a high-order position exists or not based on the light field distribution and a brightness characteristic of the diffraction phenomenon; the high-order position is a position of pixels of a first partial region in a region of the first image other than the high-brightness region when a difference value between pixel brightness of the first partial region and pixel brightness of a second partial region is greater than a first threshold, and the pixel brightness of the first partial region is higher than the pixel brightness of the second partial region; and when the high-order position exists, it is determined that the image region meeting the diffraction phenomenon exists.

In the example of the present disclosure, the brightness characteristic of the diffraction phenomenon may be determined based on an experiment. For example, in the light intensity distribution curve obtained based on the diffraction experiment in FIG. 7, normal distributions identified with K1 are first-order positions, normal distributions identified with K2 are second-order positions, and light intensity values corresponding to the second-order positions are lower than light intensity values corresponding to the first-order positions. It is to be noted that both the first-order position and the second-order position are positions where brightness of partial regions is higher than practical brightness due to diffraction, pixel brightness at the first-order position is higher than pixel brightness of the partial region around the first-order position, and pixel brightness at the second-order position is also higher than pixel brightness of the partial region around the second-order position. In the example of the present disclosure, both the first-order position and the second-order position are high-order positions. The high-order positions exist, there may be a certain proportional relationship between the brightness of the pixels at the high-order positions and the brightness of the light source, the pixel brightness at the high-order positions is higher than the pixel brightness of the partial regions around the high-order positions. With the increase of the order, the pixel brightness at the high-order positions is reduced. All these features are brightness characteristics of the diffraction phenomenon.

It is to be noted that, in the present disclosure, the high-order position is not limited to the first-order position and the second-order position. For example, when the brightness of the light source is high enough, high-order positions of more orders such as third-order positions and fourth-order positions may also be included, brightness at the third-order position being lower than the brightness at the second-order position and brightness at the fourth-order position being lower than the brightness at the third-order position. It is to be noted that, when the diffraction phenomenon occurs, at least the first-order positions exist.

Based on the brightness characteristic of the diffraction phenomenon, in the present disclosure, it may be determined whether the high-order position exists or not based on the light field distribution of the first image and the brightness characteristic of the diffraction phenomenon. Specifically, it is determined whether high-order positions similar to those in the light intensity distribution curve in FIG. 7 exist or not based on the light field distribution of the brightness of each pixel in the first image. The high-order position is the position of the pixels of the first partial region in the region other than the high-brightness region of the first image when the difference value between the pixel brightness of the first partial region and pixel brightness of the second partial region is greater than the first threshold, and the pixel brightness of the first partial region is higher than the pixel brightness of the second partial region.

In the example, the region other than the high-brightness region includes the first partial region and the second partial region. When a pixel brightness difference between the first partial region and the second partial region is greater than the first threshold, the position of the pixels of the first region with higher pixel brightness is determined as the high-order position. The first partial region and the second partial region are adjacent regions.

It is to be noted that, in the example of the present disclosure, a clustering algorithm may be adopted to perform brightness clustering on the brightness of each pixel of the region other than the high-brightness region to determine partial regions with different brightness. The brightness of adjacent partial regions may be compared to determine whether a difference value is greater than the first threshold or not to determine the high-order position.

In an example, the first image includes a high-order position. For example, the image processing device may determine whether a position similar to the first-order position identified with K1 in FIG. 7 exists in the light field distribution or not.

In another example, the first image may include high-order positions of K orders, K being larger than or equal to 2, and pixel brightness at the high-order position of a Kth order is equal to pixel brightness at the high-order position of a (K−1)th order or is negatively correlated with a value of K. For example, when there are high-order positions of two orders, the image processing device may determine whether positions similar to the first-order position identified with K1 and the second-order position identified with K2 exist in the light field distribution or not, the pixel brightness at the first-order position being higher than the pixel brightness at the second-order position. For another example, when there are three high-order positions, the image processing device may also determine whether the third-order positions identified in FIG. 7 exist or not, the pixel brightness at the third-order position being lower than the pixel brightness at the second-order position.

In addition, it is to be noted that, in the example of the present disclosure, when high-order positions of different orders are determined, the first threshold is variable. For example, the first threshold may be negatively correlated with the value of K.

In an example, the operation that it is determined that the image region meeting the diffraction phenomenon exists when the high-order position exists may include that:

it is determined whether a similarity between a shape formed by the pixels at the high-order position and a shape of the high-brightness region is greater than a first similarity threshold or not; and when the similarity is greater than the first similarity threshold, it is determined that the image region meeting the diffraction phenomenon exists.

Due to diffraction, there may be a subregion similar to the high-brightness region in shape in the diffraction region. The subregion is a region correspondingly formed by the pixels at the first-order position or second-order positions in the high-order positions. Therefore, in the example, it is necessary to further determine whether the similarity between the shape formed by the pixels at the high-order position and the shape of the high-brightness region is greater than the first similarity threshold or not. When the similarity is greater than the first similarity threshold, it is determined that the image region meeting the diffraction phenomenon exists.

It is to be noted that, when the high-order position includes the first-order position, it is determined whether a similarity between a shape formed by the pixels at the first-order position and the shape of the high-brightness region is greater than the first similarity threshold or not. When the high-order position includes the first-order position and the second-order position, it is necessary to determine whether similarities between shapes formed by the pixels at the first-order position and the second-order position and the shape of the high-brightness region are greater than the first similarity threshold or not respectively.

For example, in FIG. 4, A1 in FIG. 4 is a first-order position, brightness of a pixel in A1 is lower than brightness of a pixel in the high-brightness region L2 only, and a shape of A1 is similar to a strip. A2 in FIG. 4 is a second-order position, brightness of a pixel in A2 is lower than the brightness of the pixel in A1, and a shape of A2 is also similar to a strip.

It is to be noted that, when the shapes formed by the pixels of the high-brightness region, the first-order position and the second-order position in the first image are determined, contours may be determined by use of an edge detection operator such as a canny operator and a sobel operator. A contour feature corresponding to the first-order position and a contour feature corresponding to the second-order position may be compared with a contour feature of the high-brightness region based on the determined contours to determine similarities. The contour feature may be a curvature of the contour, a similarity of a length and diameter of the contour and the like. How to determine the similarity between the shapes is not specifically limited in the present disclosure.

It can be understood that, in the example of the present disclosure, when whether the diffraction region exists or not is determined, whether the high-order position exists or not is determined based on the brightness characteristic of the diffraction phenomenon, and whether the diffraction region exists or not is also determined based on whether the similarity between the shapes of the high-order position and the high-brightness region meets a condition or not, so that the accuracy of determining the diffraction region may be improved.

In an example, the method may further include that:

whether a dispersion phenomenon exists in the diffraction region or not is determined based on a color difference between pixels in the diffraction region and pixels outside the diffraction region.

The operation that the brightness of the diffraction region is reduced to obtain the second image may includes that:

when the dispersion phenomenon exists in the diffraction region, color saturation and the brightness of the diffraction region are reduced to obtain the second image. The dispersion phenomenon refers to a phenomenon that a polychromatic beam is decomposed into multiple monochromatic beams. For example, white light is synthesized from light with different wavelengths, and when the white light passes through a medium (for example, a triangular prism), dispersed monochromatic light of seven colors is seen. This is a dispersion phenomenon. It can be understood that, when the dispersion phenomenon occurs, a color of a formed image may be changed.

The dispersion phenomenon occurs at an edge of the diffraction region sometimes. When dispersion does not occur, color of pixels at the edge of the diffraction region is relatively consistent with that of the background part, the background part refers to a part other than the high-brightness region and the diffraction region. When dispersion occurs, the color of the pixels at the edge of the diffraction region may be different from that of the background part. In the example of the present disclosure, a color difference between the pixels at the edge of the diffraction region and the pixels outside the diffraction region is reflected in the following aspects. One aspect is determining whether a color mode of the pixels at the edge of the diffraction region is consistent with a color mode of the pixels outside the diffraction region. For example, the pixels outside the diffraction region are monochromatic, while the pixels at the edge of the diffraction region are polychromatic. In such a case, it is determined that the color modes are different, and dispersion may occur when the color modes are different. Another aspect is determining whether a color saturation of the pixels at the edge of the diffraction region are different from a color saturation of the pixels outside the diffraction region.

Therefore, in the present disclosure, whether the dispersion phenomenon exists in the diffraction region or not is determined based on the color difference between the pixels in the diffraction region and the pixels outside the diffraction region. In the example, when the dispersion phenomenon exists in the diffraction region, the color saturation of the diffraction region with the dispersion phenomenon is reduced to alleviate the dispersion phenomenon.

Figure 8A:
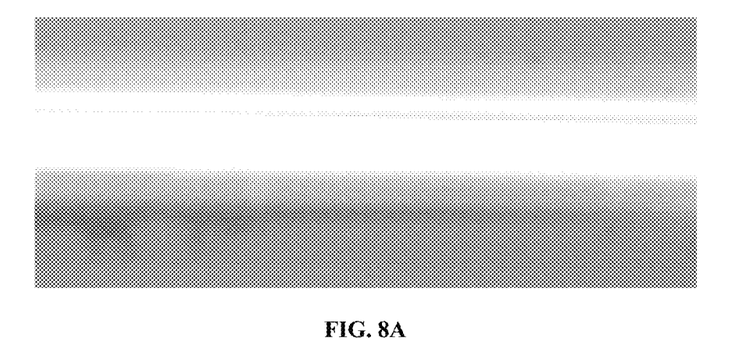
FIG. 8A is a schematic diagram illustrating a dispersion phenomenon in a diffraction region according to an example of the present disclosure.
Figure 8B:
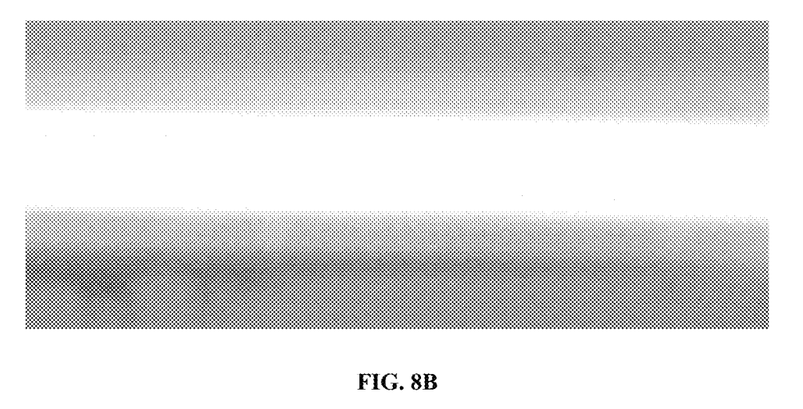
FIG. 8B is a schematic diagram illustrating reduction of a color saturation of an edge of a diffraction region according to an example of the present disclosure.

FIG. 8A is a schematic diagram illustrating a dispersion phenomenon in a diffraction region according to an example of the present disclosure. FIG. 8B is a schematic diagram illustrating reduction of a color saturation of an edge of a diffraction region according to an example of the present disclosure. As shown in FIG. 8A, there is a diffraction region around an illumination light source, and after the white illumination light source is diffracted, the diffraction region includes multiple color components, namely there is the dispersion phenomenon in the diffraction region. As shown in FIG. 8B, after the color saturation of the diffraction region with the dispersion phenomenon is reduced, the color of the edge of the diffraction region tends to be consistent with that of the background part.

In the example, when dispersion occurs in the diffraction region, the second image may be obtained by not only reducing the brightness of the diffraction region but also reducing the color saturation of the edge of the diffraction region influenced by the dispersion phenomenon. It can be understood that, in such a manner, an overlap image formed by diffraction may be alleviated by reducing the brightness of the diffraction region, and in addition, the false color caused by dispersion may also be alleviated, so that a more real image may be obtained.

In an example, the operation that whether the dispersion phenomenon exists in the diffraction region or not is determined based on the color difference between the pixels in the diffraction region and the pixels outside the diffraction region may include that:

a color difference value between the pixels in the diffraction region with the dispersion phenomenon and the pixels outside the diffraction region is acquired; and when the color difference value is greater than a preset color threshold, it is determined that the dispersion phenomenon exists in the diffraction region.

In the example, when whether the dispersion phenomenon exists in the diffraction region or not is determined based on the color difference between the pixels in the diffraction regions and the pixels outside the diffraction region, a determination may be made based on the color difference value and the preset color threshold.

When the color difference value is determined, average values of a Red (R) component, average values of a Green (G) component and average values of a Blue (B) component may be determined based on color information of the pixels in the diffraction region and the pixels outside the diffraction region, for example, color components of each pixel in an RGB color space: an R pixel, a G pixel and a B pixel, respectively, and subtraction may be performed on the average values of the color components of the pixels in the diffraction region and the average values of the corresponding color components of the pixels outside the diffraction region. Meanwhile, it is determined that the dispersion phenomenon exists in the diffraction region when it is determined based on a preset color threshold for each color component that a difference value between the average values of each color component is greater than the corresponding preset color threshold.

In the RGB space, a value of each color component is closely correlated with the brightness, namely the value of each color component may correspondingly change when the brightness changes. Therefore, the RGB space may not reflect color related information more directly. Therefore, in the present disclosure, the first image belonging to the RGB space may be converted to a Hue Saturation Value (HSV)/Hue Saturation Lightness (HSL) space, and the color difference value between the pixels in the diffraction region with the dispersion phenomenon and the pixels outside the diffraction region is acquired in the HSV/HSL space.

In the HSV/HSL space, H reflects the hue, S reflects the color saturation in the corresponding hue space, and both H and S are information reflecting the color. Therefore, the color difference value may be determined based on information about the H and the S after color space conversion to improve the accuracy of determining the color difference.

In the HSV/HSL space, for example, statistics may be made to average values of an H component and average values of an S component of the pixels in the diffraction region and outside the diffraction region respectively, and it may be determined that the dispersion phenomenon exists in the diffraction region when it is determined based on differences between the average values and the preset color thresholds of the corresponding components that the difference value between the average values of each component is greater than the corresponding preset color threshold.

In an example, the operation S13 may include that:

a brightness value to be regulated is determined based on a brightness value of each pixel in the diffraction region and a positive relationship with the brightness value of the each pixel; and the brightness value to be regulated corresponding to each pixel is subtracted from the brightness value of each pixel in the diffraction region to obtain the second image with a Gaussian distribution of brightness values.

In the example, after the brightness of the diffraction region is reduced to obtain the second image with regulated brightness, the brightness value to be regulated may be determined based on the brightness value of each pixel in the diffraction region and the positive relationship with the brightness value of the each pixel. The positive relationship refers to that, when the brightness value of the pixel in the diffraction region is greater, the determined brightness value to be regulated is greater.

As described above, the light field distribution of the brightness of each pixel in the first image is similar to the light intensity distribution curve in FIG. 7, and the diffraction region includes normal distribution parts including K1 and K2. For example, for K1, when the brightness value to be regulated is determined, it may be set that a value to be regulated at a peak value is maximum, and a value to be regulated corresponding to a pixel around the peak value is relatively low, so that the values to be regulated of the K1 part form a curve similar to an inverse normal distribution. After the value to be regulated is determined in such a manner, the value to be regulated corresponding to the K1 part may be subtracted from the brightness value of each pixel of the K1 part, so that the K1 part is approximate to a straight line. Similarly, for the K2 part, a value to be regulated is determined by the same method, and the value to be regulated corresponding to the K2 part is subtracted from the brightness value of each pixel of the K2 part, so that the curve, presenting a normal distribution, of the K2 part also changes to be approximate to a straight line.

It can be understood that, after the brightness value to be regulated corresponding to each pixel is subtracted from the brightness value of each pixel in the diffraction region, the normal distribution phenomenon similar to K1 and K2 in FIG. 7 disappears, and a curve with a Gaussian distribution (i.e., normal distribution) of the brightness is presented, namely the brightness values of the obtained second image form the Gaussian distribution.

In an example, the operation S13 may include that:

the brightness of the diffraction region is reduced based on an inverse Gamma function to obtain the second image with regulated brightness.

Figure 9:
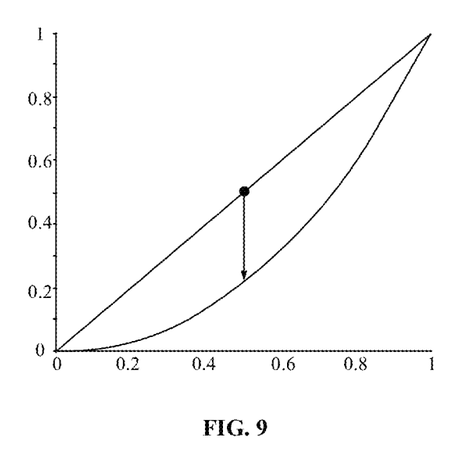
FIG. 9 is a schematic diagram illustrating a curve of an inverse Gamma function.

In the example of the present disclosure, the brightness of the diffraction region may also be reduced based on the inverse Gamma function. FIG. 9 is a schematic diagram illustrating a curve of an inverse Gamma function. Based on the curve of the inverse Gamma function in FIG. 9, it can be understood that, when the brightness is reduced by use of the inverse Gamma function based on the first image, the brightness of the K1 and K2 parts in the diffraction region in FIG. 7 may be reduced, and the light source part other than K1 and K2 is kept unchanged. Therefore, in the second image with the regulated brightness obtained through the method, the overlap image formed by diffraction may also be alleviated to a certain extent, and the second image is more real than the first image.

In an example, the operation S13 may include that:
the first image including the diffraction region is input to a preset image quality compensation model to obtain the second image with regulated brightness, the preset image quality compensation model being obtained by training through a neural network.

In the example of the present disclosure, the image quality of the first image may also be compensated through the preset image quality compensation model. It is to be noted that, through the image quality compensation model, the brightness of the input image may be regulated to improve the image quality of the image. Therefore, after the first image is input to the model, the second image with the regulated brightness may be obtained.

In the example, the preset image quality compensation model is obtained by training through a neural network. For example, the image quality compensation model is a model obtained by training a large number of sample images through a convolutional neural network or a deep neural network. Specifically, the sample images may be practical images influenced by the diffraction phenomenon and contrast images with no diffraction phenomenon, which are obtained by performing image collection on the same target object before delivery of a terminal device. The practical image suffering diffraction is acquired in a scenario that a display screen is arranged on a camera of the terminal device, and a contrast image not suffering diffraction is acquired in a scenario that the display screen is not arranged on the camera of the terminal device. Training is performed by use of a neural network model based on the acquired practical images not suffering diffraction. In a training process, image quality differences between training values of the practical images and the contrast images are measured through a loss function, thereby continuously optimizing a parameter in the network by back propagation to obtain the trained image quality compensation model.

Figure 10:
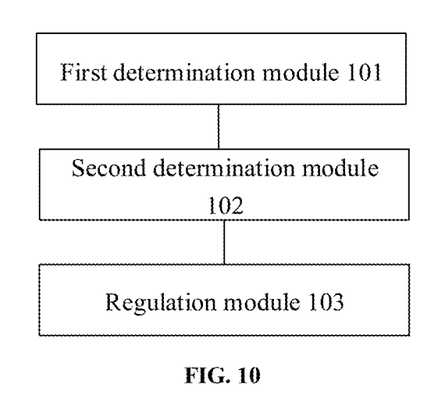
FIG. 10 is a diagram of a device for image processing according to an example.

FIG. 10 is a diagram of a device for image processing according to an example. Referring to FIG. 10, the device for image processing includes:
a first determination module 101, configured to determine a high-brightness region based on brightness of pixels in a first image, brightness of pixels in the high-brightness region being higher than brightness of pixels around the high-brightness region;
a second determination module 102, configured to determine a diffraction region in the first image based on the high-brightness region, the diffraction region being an image region around the high-brightness region; and
a regulation module 103, configured to reduce brightness of the diffraction region to obtain a second image.

Optionally, the second determination module 102 is specifically configured to determine a light field distribution of the brightness of the pixels in the first image, determine whether an image region meeting a diffraction phenomenon exists in a brightness reduction direction of the high-brightness region in the first image or not based on the light field distribution and, when the image region meeting the diffraction phenomenon exists, determine the image region as the diffraction region.

Optionally, the second determination module 102 is specifically configured to determine whether a high-order position exists or not based on the light field distribution and a brightness characteristic of the diffraction phenomenon, the high-order position being a position of pixels of a first partial region in a region of the first image other than the high-brightness region when a difference value between pixel brightness of the first partial region and pixel brightness of a second partial region is greater than a first threshold, and the pixel brightness of the first partial region being higher than the pixel brightness of the second partial region.

Optionally, the second determination module is specifically configured to determine whether a similarity between a shape formed by the pixels at the high-order position and a shape of the high-brightness region is greater than a first similarity threshold or not and, when the similarity is greater than the first similarity threshold, determine that the image region meeting the diffraction phenomenon exists. When the similarity is greater than the first similarity threshold, it is determined that the image region meeting the diffraction phenomenon exists.

Optionally, the first image includes high-order positions of K orders, K being larger than or equal to 2, and pixel brightness at the high-order position of a Kth order is equal to pixel brightness at the high-order position of a (K−1)th order or is negatively correlated with a value of K.

Optionally, the device may further include:
a third determination module 104, specifically configured to determine whether a dispersion phenomenon exists in the diffraction region or not based on a color difference between pixels in the diffraction region and pixels outside the diffraction region; when the dispersion phenomenon exists in the diffraction region, color saturation and the brightness of the diffraction region are reduced; and
the regulation module 103 is specifically configured to, when the dispersion phenomenon exists in the diffraction region, reduce color saturation and the brightness of the diffraction region to obtain the second image.

Optionally, the third determination module 104 is specifically configured to acquire a color difference value between the pixels in the diffraction region and the pixels outside the diffraction region and, when the color difference value is greater than a preset color threshold, determine that the dispersion phenomenon exists in the diffraction region.

Optionally, the regulation module 103 is specifically configured to determine a brightness value to be regulated based on a brightness value of each pixel in the diffraction region and a positive relationship with the brightness value of the each pixel and subtract the brightness value to be regulated corresponding to each pixel from the brightness value of each pixel in the diffraction region to obtain the second image with a Gaussian distribution of brightness values.

Optionally, the regulation module 103 is specifically configured to reduce the brightness of the diffraction region based on an inverse Gamma function to obtain the second image with regulated brightness.

Optionally, the regulation module 103 is specifically configured to input the first image including the diffraction region to a preset image quality compensation model to obtain the second image with regulated brightness, the preset image quality compensation model being obtained by training through a neural network.

Optionally, the first determination module 101 is specifically configured to perform clustering based on a brightness value of each pixel in the first image to obtain different regions, a brightness difference between pixels in any region being within a preset difference range, and determine a region with a maximum average brightness value from the obtained different regions as the high-brightness region.

With respect to the device in the above examples, the specific manner for the operation executed by each module has been described in detail in the examples related to the above method, and is not elaborated herein.

Figure 11:
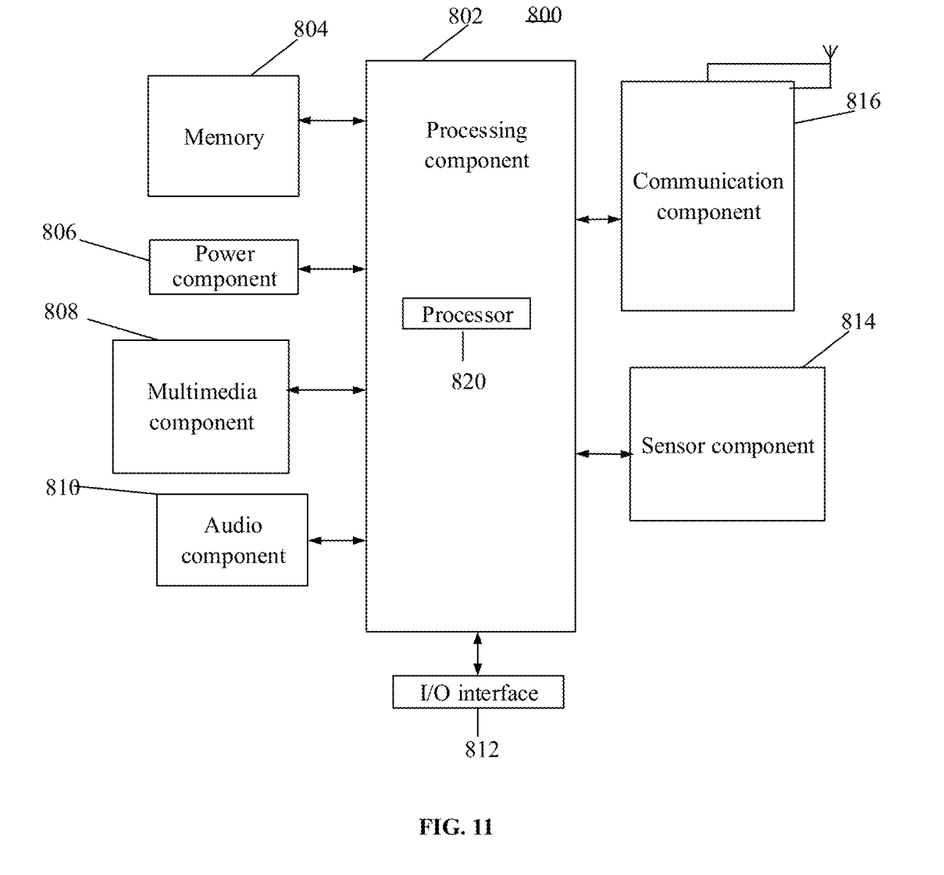
FIG. 11 is a block diagram of a terminal device according to an example of the present disclosure.

FIG. 11 is a block diagram of a terminal device 800 according to an example. For example, the terminal device 800 may be a mobile phone, a mobile computer and the like.

Referring to FIG. 11, the terminal device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the terminal device 800. Examples of such data include instructions for any applications or methods operated on the terminal device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the terminal device 800. The power component 806 may include a power management system, one or more power supplies, and other components associated with generation, management and distribution of power for the terminal device 800.

The multimedia component 808 includes a screen providing an output interface between the terminal device 800 and a user. In some examples, the screen may include a Liquid Crystal Display (LCD) and a Touch Panel (TP). When the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some examples, the multimedia component 808 includes a front camera and/or a rear camera. The front camera and/or the rear camera may receive external multimedia data when the terminal device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the terminal device 800 is in the operation mode, such as a call mode, a recording mode and a voice recognition mode. The received audio signal may further be stored in the memory 804 or sent through the communication component 816. In some examples, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the terminal device 800. For instance, the sensor component 814 may detect an on/off status of the terminal device 800 and relative positioning of components, such as a display and small keyboard of the terminal device 800, and the sensor component 814 may further detect a change in a position of the terminal device 800 or a component of the terminal device 800, presence or absence of contact between the user and the terminal device 800, orientation or acceleration/deceleration of the terminal device 800 and a change in temperature of the terminal device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some examples, the sensor component 814 may also include an acceleration sensor, a gyroscope sensor, a magnetic sensor, a pressure sensor or a temperature sensor.

The communication component 816 is configured to facilitate wired or wireless communication between the terminal device 800 and another device. The device 800 may access a communication-standard-based wireless network, such as a Wireless Fidelity (Wi-Fi) network, a 2nd-Generation (2G) or 3rd-Generation (3G) network or a combination thereof. In an example, the communication component 816 receives a broadcast signal or broadcast associated information from an external broadcast management system through a broadcast channel. In an example, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra Wide Band (UWB) technology, a Bluetooth (BT) technology and another technology.

In an example, the terminal device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an example, there is also provided a non-transitory computer-readable storage medium including an instruction, such as the memory 804 including an instruction, and the instruction may be executed by the processor 820 of the terminal device 800 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

A non-transitory computer-readable storage medium is also provided, which stores instructions that, when executed by a processor of a terminal device, enable the terminal device to execute a control method, the method including:

determining a high-brightness region based on brightness of pixels in a first image, wherein brightness of pixels in the high-brightness region is higher than brightness of pixels around the high-brightness region;

determining a diffraction region in the first image based on the high-brightness region, wherein the diffraction region is an image region around the high-brightness region; and reducing brightness of the diffraction region to obtain a second image.

Optionally, the determining the diffraction region in the first image based on the high-brightness region may include:

determining a light field distribution of the brightness of the pixels in the first image;

determining whether an image region meeting a diffraction phenomenon exists in a brightness reduction direction of the high-brightness region in the first image or not based on the light field distribution; and when the image region meeting the diffraction phenomenon exists, determining the image region as the diffraction region.

Optionally, the determining whether the image region meeting the diffraction phenomenon exists in the brightness reduction direction of the high-brightness region in the first image or not based on the light field distribution may include:

determining whether a high-order position exists or not based on the light field distribution and a brightness characteristic of the diffraction phenomenon, wherein the high-order position is a position of pixels of a first partial region in a region of the first image other than the high-brightness region when a difference value between pixel brightness of the first partial region and pixel brightness of a second partial region is greater than a first threshold, and the pixel brightness of the first partial region is higher than the pixel brightness of the second partial region; and when the high-order position exists, determining that the image region meeting the diffraction phenomenon exists.

Optionally, the determining that the image region meeting the diffraction phenomenon exists when the high-order position exists may include:

determining whether a similarity between a shape formed by the pixels at the high-order position and a shape of the high-brightness region is greater than a first similarity threshold or not; and when the similarity is greater than the first similarity threshold, determining that the image region meeting the diffraction phenomenon exists.

Optionally, the first image may include high-order positions of K orders, K being larger than or equal to 2, and pixel brightness at the high-order position of a Kth order may be equal to pixel brightness at the high-order position of a (K−1)th order or is negatively correlated with a value of K.

Optionally, the method may further include:

determining whether a dispersion phenomenon exists in the diffraction region or not based on a color difference between pixels in the diffraction region and pixels outside the diffraction region; and the reducing the brightness of the diffraction region to obtain the second image may include:

when the dispersion phenomenon exists in the diffraction region, color saturation and the brightness of the diffraction region are reduced to obtain the second image.

Optionally, the determining whether the dispersion phenomenon exists in the diffraction region or not based on the color difference between the pixels in the diffraction region and the pixels outside the diffraction region may include:

acquiring a color difference value between the pixels in the diffraction region and the pixels outside the diffraction region; and when the color difference value is greater than a preset color threshold, it is determined that the dispersion phenomenon exists in the diffraction region.

Optionally, the reducing the brightness of the diffraction region to obtain the second image may include:

determining a brightness value to be regulated based on a brightness value of each pixel in the diffraction region and a positive relationship with the brightness value of the each pixel; and subtracting the brightness value to be regulated corresponding to the each pixel from the brightness value of the each pixel in the diffraction region to obtain the second image with a Gaussian distribution of brightness values.

Optionally, the reducing the brightness of the diffraction region to obtain the second image may include:

reducing the brightness of the diffraction region based on an inverse Gamma function to obtain the second image with regulated brightness.

Optionally, the determining the high-brightness region based on the brightness of the pixels in the first image may include:

performing clustering based on a brightness value of each pixel in the first image to obtain different regions, wherein a brightness difference between pixels in any region is within a preset difference range; and determining a region with a maximum average brightness value from the obtained different regions as the high-brightness region.

Optionally, the reducing the brightness of the diffraction region to obtain the second image may include:

inputting the first image comprising the diffraction region to a preset image quality compensation model to obtain the second image with regulated brightness, the preset image quality compensation model being obtained by training through a neural network.

In the present disclosure, a high-brightness region in a first image is determined at first, then a diffraction region is determined based on the high-brightness region, and brightness of the diffraction region is reduced to obtain a second image. On one hand, in the manner of reducing brightness based on a single frame of image to alleviate overlap images formed by diffraction, processing may be performed based on the single frame of image without the influence of images obtained based on other different exposure values, so that the effect of alleviating the overlap images formed by diffraction is more stable. On the other hand, it is unnecessary to regulate an exposure value to shoot multiple frames of images, so that the power consumption in frequent photographing of a mobile terminal may be reduced. Moreover, adverse impacts of ghosts and the like during fusion of multiple groups of images with different exposure values may be avoided.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof.

What is claimed is:

1. A method for image processing, comprising:
    determining a high-brightness region based on brightness of pixels in a first image, wherein brightness of pixels in the high-brightness region is higher than brightness of pixels around the high-brightness region;
    determining a diffraction region in the first image based on the high-brightness region, wherein the diffraction region is an image region around the high-brightness region; and
    reducing brightness of the diffraction region to obtain a second image,
    wherein determining the high-brightness region based on the brightness of the pixels in the first image comprises:
    performing clustering based on a brightness value of each pixel in the first image to obtain different regions, wherein a brightness difference between pixels in any region is within a preset difference range; and
    determining a region with a maximum average brightness value from the obtained different regions as the high-brightness region.

2. The method of claim 1, wherein determining the diffraction region in the first image based on the high-brightness region comprises:
    determining a light field distribution of the brightness of the pixels in the first image;
    determining whether an image region meeting a diffraction phenomenon exists in a brightness reduction direction of the high-brightness region in the first image or not based on the light field distribution; and
    when the image region meeting the diffraction phenomenon exists, determining the image region as the diffraction region.

3. The method of claim 2, wherein determining whether the image region meeting the diffraction phenomenon exists in the brightness reduction direction of the high-brightness region in the first image or not based on the light field distribution comprises:
    determining whether a high-order position exists or not based on the light field distribution and a brightness characteristic of the diffraction phenomenon, wherein the high-order position is a position of pixels of a first partial region in a region of the first image other than the high-brightness region when a difference value between pixel brightness of the first partial region and pixel brightness of a second partial region is greater than a first threshold, and the pixel brightness of the first partial region is higher than the pixel brightness of the second partial region; and
    when the high-order position exists, determining that the image region meeting the diffraction phenomenon exists.

4. The method of claim 3, wherein determining that the image region meeting the diffraction phenomenon exists when the high-order position exists comprises:
    determining whether a similarity between a shape formed by the pixels at the high-order position and a shape of the high-brightness region is greater than a first similarity threshold or not; and
    when the similarity is greater than the first similarity threshold, determining that the image region meeting the diffraction phenomenon exists.

5. The method of claim 3, wherein the first image comprises high-order positions of K orders, K being larger than or equal to 2, and pixel brightness at the high-order position of a Kth order is equal to pixel brightness at the high-order position of a (K−1)th order or is negatively correlated with a value of K.

6. The method of claim 1, further comprising:
    determining whether a dispersion phenomenon exists in the diffraction region or not based on a color difference between pixels in the diffraction region and pixels outside the diffraction region, and
    wherein reducing the brightness of the diffraction region to obtain the second image comprises: when the dispersion phenomenon exists in the diffraction region, reducing color saturation and the brightness of the diffraction region to obtain the second image.

7. The method of claim 6, wherein determining whether the dispersion phenomenon exists in the diffraction region or not based on the color difference between the pixels in the diffraction region and the pixels outside the diffraction region comprises:
    acquiring a color difference value between the pixels in the diffraction region and the pixels outside the diffraction region; and
    when the color difference value is greater than a preset color threshold, determining that the dispersion phenomenon exists in the diffraction region.

8. The method of claim 1, wherein reducing the brightness of the diffraction region to obtain the second image comprises:

determining a brightness value to be regulated based on a brightness value of each pixel in the diffraction region and a positive relationship with the brightness value of the each pixel; and subtracting the brightness value to be regulated corresponding to the each pixel from the brightness value of the each pixel in the diffraction region to obtain the second image with a Gaussian distribution of brightness values.

9. The method of claim 1, wherein reducing the brightness of the diffraction region to obtain the second image comprises:

reducing the brightness of the diffraction region based on an inverse Gamma function to obtain the second image with regulated brightness.

10. The method of claim 1, wherein reducing the brightness of the diffraction region to obtain the second image comprises:

inputting the first image comprising the diffraction region to a preset image quality compensation model to obtain the second image with regulated brightness, wherein the preset image quality compensation model is obtained by training through a neural network.

11. A device for image processing, comprising:

a processor; and a memory, storing instructions executable by the processor;

wherein the processor is configured to:

determine a high-brightness region based on brightness of pixels in a first image, wherein brightness of pixels in the high-brightness region is higher than brightness of pixels around the high-brightness region;

determine a diffraction region in the first image based on the high-brightness region, wherein the diffraction region is an image region around the high-brightness region; and reduce brightness of the diffraction region to obtain a second image, wherein the processor is further configured to:

perform clustering based on a brightness value of each pixel in the first image to obtain different regions, wherein a brightness difference between pixels in any region is within a preset difference range; and determine a region with a maximum average brightness value from the obtained different regions as the high-brightness region.

12. The device of claim 11, wherein the processor is further configured to:

determine a light field distribution of the brightness of the pixels in the first image;

determine whether an image region meeting a diffraction phenomenon exists in a brightness reduction direction of the high-brightness region in the first image or not based on the light field distribution and;

when the image region meeting the diffraction phenomenon exists, determine the image region as the diffraction region.

13. The device of claim 12, wherein the processor is further configured to:

determine whether a high-order position exists or not based on the light field distribution and a brightness characteristic of the diffraction phenomenon, wherein the high-order position is a position of pixels of a first partial region in a region of the first image other than the high-brightness region when a difference value between pixel brightness of the first partial region and pixel brightness of a second partial region is greater than a first threshold, and the pixel brightness of the first partial region is higher than the pixel brightness of the second partial region.

14. The device of claim 13, wherein the processor is further configured to:

determine whether a similarity between a shape formed by the pixels at the high-order position and a shape of the high-brightness region is greater than a first similarity threshold or not; and when the similarity is greater than the first similarity threshold, determine that the image region meeting the diffraction phenomenon exists.

15. The device of claim 13, wherein the first image comprises high-order positions of K orders, K being larger than or equal to 2, and pixel brightness at the high-order position of a Kth order is equal to pixel brightness at the high-order position of a (K−1)th order or is negatively correlated with a value of K.

16. The device of claim 11, wherein the processor is further configured to:

determine whether a dispersion phenomenon exists in the diffraction region or not based on a color difference between pixels in the diffraction region and pixels outside the diffraction region; and when the dispersion phenomenon exists in the diffraction region, reduce color saturation and the brightness of the diffraction region to obtain the second image.

17. The device of claim 16, wherein the processor is further configured to:

acquire a color difference value between the pixels in the diffraction region and the pixels outside the diffraction region; and when the color difference value is greater than a preset color threshold, determine that the dispersion phenomenon exists in the diffraction region.

18. The device of claim 11, wherein the processor is further configured to:

determine a brightness value to be regulated based on a brightness value of each pixel in the diffraction region and a positive relationship with the brightness value of the each pixel; and subtract the brightness value to be regulated corresponding to the each pixel from the brightness value of the each pixel in the diffraction region to obtain the second image with a Gaussian distribution of brightness values; or reduce the brightness of the diffraction region based on an inverse Gamma function to obtain the second image with regulated brightness; or input the first image comprising the diffraction region to a preset image quality compensation model to obtain the second image with regulated brightness, the preset image quality compensation model being obtained by training through a neural network.

19. A non-transitory computer-readable storage medium, storing instructions that, when executed by a processor of a computer, cause the computer to implement:

determining a high-brightness region based on brightness of pixels in a first image, wherein brightness of pixels in the high-brightness region is higher than brightness of pixels around the high-brightness region;

determining a diffraction region in the first image based on the high-brightness region, wherein the diffraction region is an image region around the high-brightness region; and reducing brightness of the diffraction region to obtain a second image, wherein determining the high-brightness region based on the brightness of the pixels in the first image comprises:

performing clustering based on a brightness value of each pixel in the first image to obtain different regions, wherein a brightness difference between pixels in any region is within a preset difference range; and determining a region with a maximum average brightness value from the obtained different regions as the high-brightness region.

* * * * *